(12) United States Patent
Li

(10) Patent No.: US 8,596,780 B2
(45) Date of Patent: Dec. 3, 2013

(54) EYEGLASSES STRUCTURE

(75) Inventor: Jui-Chi Li, Tainan (TW)

(73) Assignee: Sun Sight Glasses Co., Ltd, Tainan (TW)

(*) Notice: Subject to any disclaimer, the term of this patent is extended or adjusted under 35 U.S.C. 154(b) by 68 days.

(21) Appl. No.: 13/453,737

(22) Filed: Apr. 23, 2012

(65) Prior Publication Data

US 2013/0033674 A1 Feb. 7, 2013

(30) Foreign Application Priority Data

Aug. 1, 2011 (TW) .............................. 100214173 U

(51) Int. Cl.
*G02C 11/02* (2006.01)

(52) U.S. Cl.
USPC .............................................. 351/51; 351/52

(58) Field of Classification Search
USPC ...................................................... 351/51–52
See application file for complete search history.

(56) References Cited

U.S. PATENT DOCUMENTS

2009/0190088 A1* 7/2009 Strobel ........................... 351/63

* cited by examiner

*Primary Examiner* — Ricky Mack
*Assistant Examiner* — Danielle Manikeu
(74) *Attorney, Agent, or Firm* — Alan Kamrath; Kamrath IP Lawfirm, P.A.

(57) ABSTRACT

Provided is an eyeglasses structure essentially including a frame body and two temples connected to two ends of the frame body, respectively. Two engagement portions are disposed at the two ends of the frame body, respectively. The two engagement portions are engaged with two decoration elements corresponding in position thereto, respectively. The decoration elements come in different color patterns to allow the eyeglasses structure to change color. Furthermore, the decoration elements pivotally connected to the frame body renders it easy to change the lenses. Hence, the eyeglasses structure is advantageously characterized by ease of assembly and disassembly and diverse patterns.

2 Claims, 4 Drawing Sheets

EYEGLASSES STRUCTURE

BACKGROUND OF THE INVENTION

1. Technical Field

The present invention relates to eyeglasses structures, and more particularly, to an eyeglasses structure advantageously characterized by ease of assembly and disassembly and diverse patterns and equipped with decoration elements pivotally connected to an eyeglasses frame and designed to come in different color patterns to allow the eyeglasses structure to achieve the aforesaid advantages.

2. Description of Related Art

Every person who wears a pair of eyeglasses, whether for myopia, hyperopia from birth, or aging-induced hyperopia, learns to change the eyeglasses which s/he is wearing when changing a venue. For instance, a myopic person wears eyeglasses to correct myopia in usual condition, sunglasses to block sunlight on a sunny day, and cyclist goggles while cycling. Hence, to meet the aforesaid needs, every person is in possession of at least two pairs of eyeglasses of different functions.

Today, many people care more about their appearance. They match their eyeglasses with their outfits and styles, using multiple eyeglasses that come in different colors and styles. Hence, consumers nowadays spend plenty money on eyeglasses of different colors and styles. Further, if the consumers need to correct their eyesight, they will have to wear eyeglasses which have corrective lenses. However, in general, lens-changing services are offered by optometrists and ophthalmologists only, and consumers are seldom in possession of a lens-changing tool. As a result, it is difficult for consumers to change the lenses of their eyeglasses on their own.

SUMMARY OF THE INVENTION

In view of the aforesaid structure and drawbacks of the prior art, the inventor of the present invention conducted extensive researches and experiments according to the inventor's expertise and years of practical development-related experience in the related industry, and finally developed a novel eyeglasses structure as disclosed in the present invention with a view to overcoming all the drawbacks of the prior art.

It is a primary objective of the present invention to provide an eyeglasses structure characterized by decoration elements which are pivotally connected to the eyeglasses frame and designed to come in different color patterns to allow the eyeglasses structure to manifest ease of assembly and disassembly and diverse patterns.

The objective and benefits of an eyeglasses structure of the present invention are achieved by the art described below.

The eyeglasses structure essentially including a frame body and two temples connected to two ends of the frame body, respectively. Two engagement portions are disposed at the two ends of the frame body, respectively. The two engagement portions are engaged with two decoration elements corresponding in position thereto, respectively. The decoration elements come in different color patterns to allow the eyeglasses structure to change color. Furthermore, the decoration elements pivotally connected to the frame body renders it easy to change the lenses. Hence, the eyeglasses structure is advantageously characterized by ease of assembly and disassembly and diverse patterns.

BRIEF DESCRIPTION OF THE DRAWINGS

Technical features, objectives and advantages of the present invention are hereunder illustrated with a specific embodiment in conjunction with the accompanying drawings, in which.

DETAILED DESCRIPTION OF THE EMBODIMENT OF THE INVENTION

Figure 1:
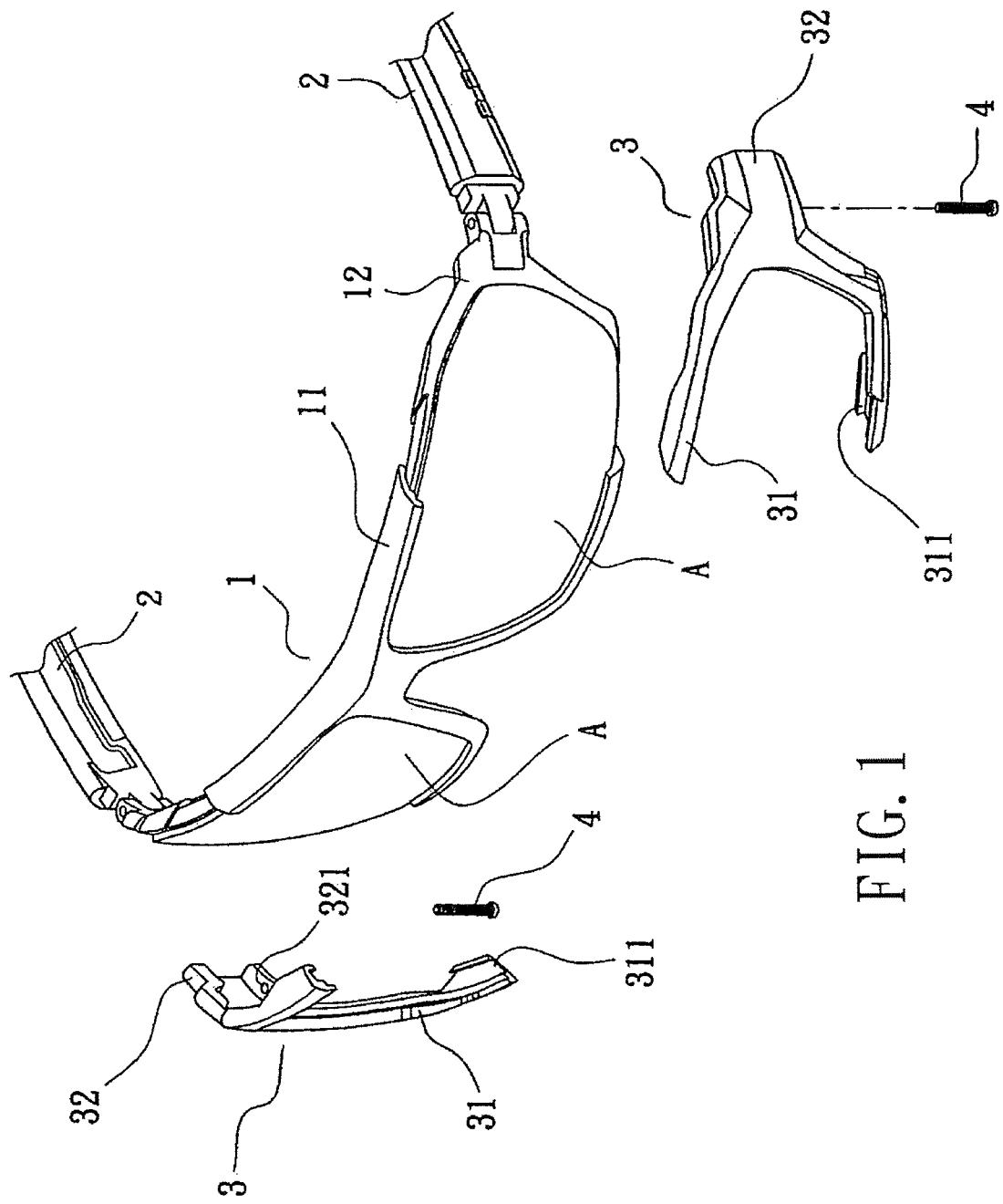
FIG. 1 is an exploded perspective view of an eyeglasses structure of the present invention.
Figure 3:
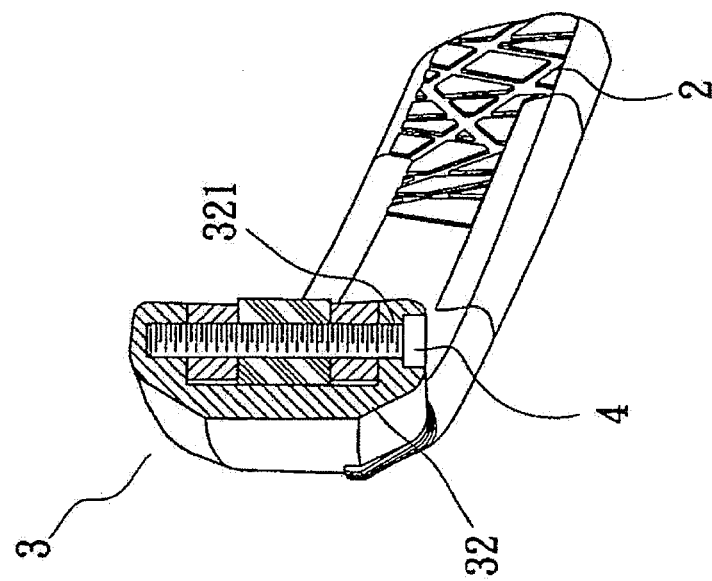
FIG. 3 is another cross-sectional schematic view of the eyeglasses structure in a pivotal connection state according to the present invention.
Figure 2:
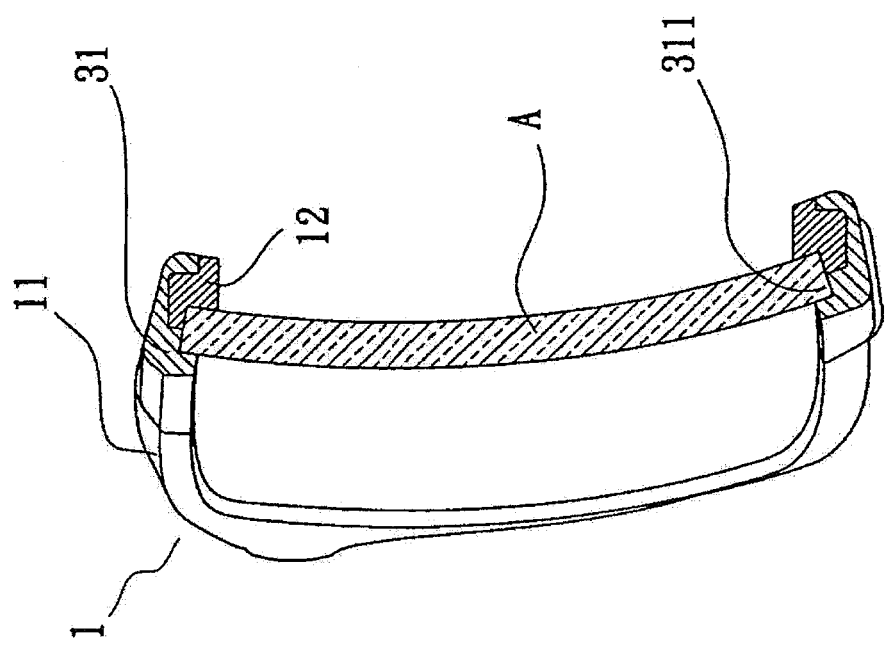
FIG. 2 is a cross-sectional schematic view of the eyeglasses structure of the present invention.
Figure 4:
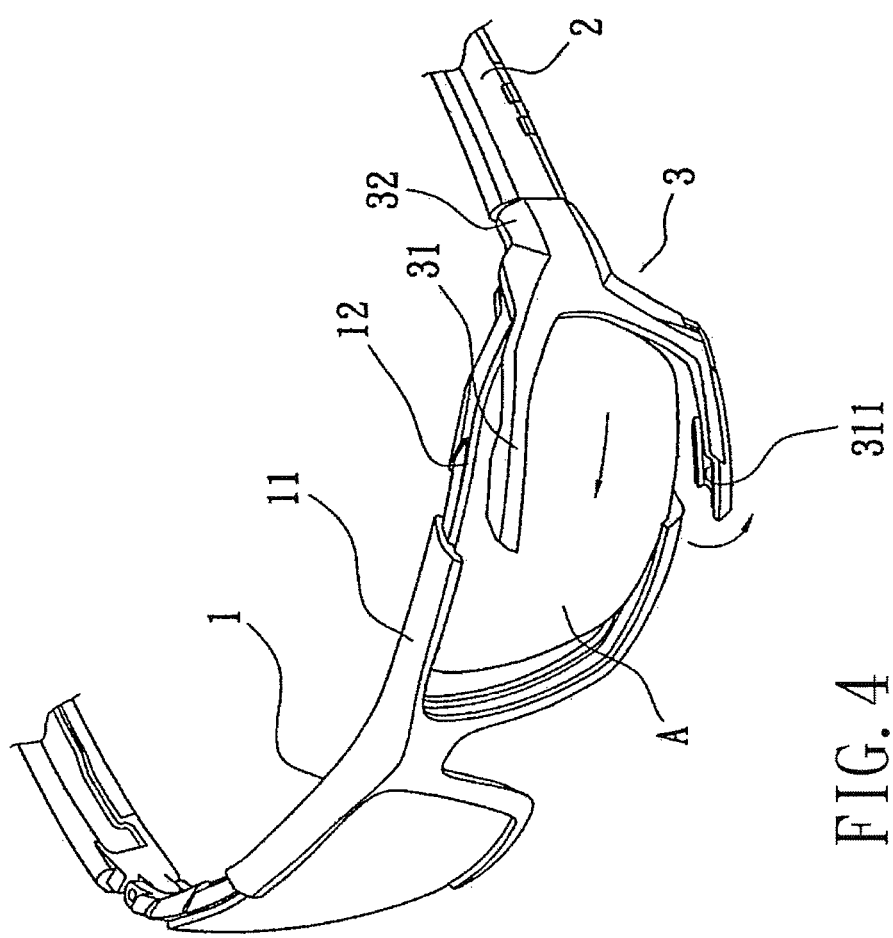
FIG. 4 is a schematic view of the eyeglasses structure in a changing state according to the present invention.
Figure 5:
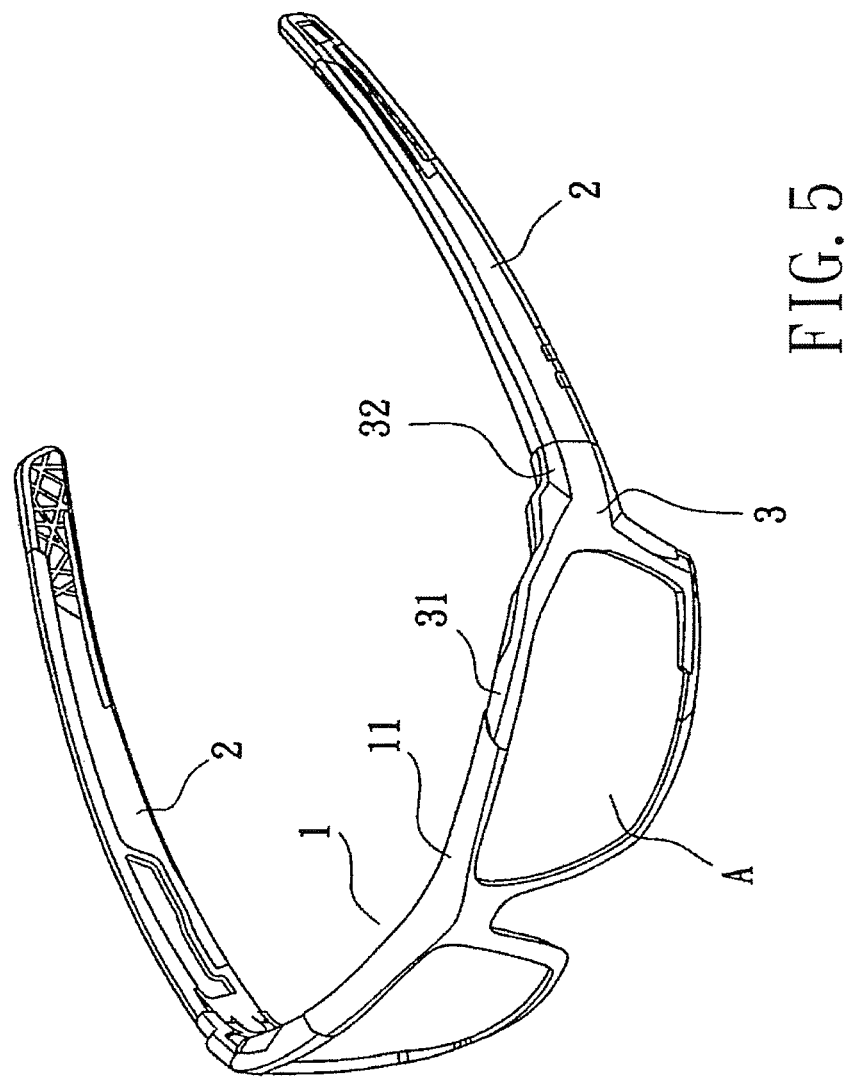
FIG. 5 is an assembled perspective view of the eyeglasses structure of the present invention.

Referring to FIG. 1 through FIG. 5, there are shown an exploded perspective view and usage-related schematic views of an eyeglasses structure of the present invention. The eyeglasses structure essentially comprises a frame body 1 and two temples 2 connected to two ends of the frame body 1, respectively.

The frame body 1 comprises a frame portion 11 for bridging two lenses A. two engagement portions 12 are coupled to the frame portion 11 and pivotally connected to the two temples 2, respectively. The engagement portions 12 are each engaged with a decoration element 3 corresponding in position thereto. The decoration elements 3 each have a first end formed with an open half frame portion 31 corresponding in position to the frame portion 11 of the frame body 1. The decoration elements 3 each have a second end located at the junction between the frame body 1 and a corresponding one of the temples 2 and formed with a tapering portion 32 serving to provide coverage. A through hole 321 is disposed at the lower end of the tapering portion 32 and corresponds in position to the junction between the frame body 1 and a corresponding one of the temples 2. The through hole 321, coupled with a pivotal connection element 4, allows a corresponding one of the decoration elements 3 to be pivotally connected to the frame body 1.

The decoration elements 3 come in different color patterns to allow the eyeglasses structure to change color. Furthermore, the decoration elements 3 pivotally connected to the frame body 1 renders it easy to change the lenses A. Hence, the eyeglasses structure of the present invention is advantageously characterized by ease of assembly and disassembly and diverse patterns.

Referring to FIG. 1 through FIG. 5, an assembly process of the eyeglasses structure of the present invention involves: aiming the through hole 321 disposed at the lower end of the tapering portion 32 of a corresponding one of the decoration elements 3 at the junction between the frame body 1 and a corresponding one of the temples 2; passing the pivotal connection element 4 through the decoration element 3, the frame body 1, and the temple 2, such that the decoration element 3 is pivotally connected to the frame body 1; and attaching the open half frame portion 31 to the frame portion 11, wherein the open half frame portion 31 is equipped with a groove 311 for fixing the lenses A in place. To replace the decoration element 3 of one color with another said decoration element 3 of another color, a user only needs to remove the pivotal connection element 4 in order to change the decoration element 3; hence, the eyeglasses structure of the present invention is advantageously characterized by ease of assembly and disassembly. To change the lenses A, the user only needs to swing the decoration elements 3 open, disconnect the old lenses A from the frame portion 11 of the frame body 1, position the new lenses A in place, and eventually swing the decoration elements 3 shut to allow the new lenses A to be fixed to the grooves 311 of the open half frame portions 31, respectively.

The aforesaid components and the description thereof indicate that, compared with the prior art, the present invention has advantages as follows:

1. An eyeglasses structure of the present invention comprises decoration elements which come in different color patterns to allow the eyeglasses structure to change color and thereby effectuate style variation.

2. An eyeglasses structure of the present invention comprises the decoration elements pivotally connected to the frame body, such that the decoration elements can be swung open for the lenses to be changed. Hence, the eyeglasses structure is advantageously characterized by ease of assembly and disassembly and diverse patterns.

In conclusion, the embodiment of the present invention is effective in achieving the anticipated benefits. The specific technical features disclosed in the present invention have not yet been applied to products which fall within the same category as the eyeglasses structure of the present invention, nor have they been published prior to the filing of this application. Accordingly, the eyeglasses structure of the present invention complies with the related clauses and requirements set forth in the patent law.

What is claimed is:

1. An eyeglasses structure, comprising:

a frame body having a frame portion for bridging two lenses, the frame portion being coupled to two engagement portions pivotally connected to the two temples, respectively;

two said temples coupled to two ends of the frame body, respectively;

two decoration elements engaged with the two engagement portions, respectively, the decoration elements each having a first end formed with an open half frame portion corresponding in position to the frame portion of the frame body, the decoration elements each having a second end corresponding in position to a junction between the frame body and a corresponding one of the temples and formed with a tapering portion serving to provide coverage, the tapering portion having a lower end at which a through hole is disposed and corresponds in position to the junction between the frame body and a corresponding one of the temples, wherein the through hole, coupled with a pivotal connection element, allows a corresponding one of the decoration elements to be pivotally connected to the frame body.

2. The eyeglasses structure of claim 1, wherein a groove is disposed at the open half frame portion of a corresponding one of the decoration elements to fix a corresponding one of the lenses in place.

* * * * *